W. MITCHELL.
STABLE FIXTURE.
APPLICATION FILED APR. 15, 1915.
1,201,068.
Patented Oct. 10, 1916.
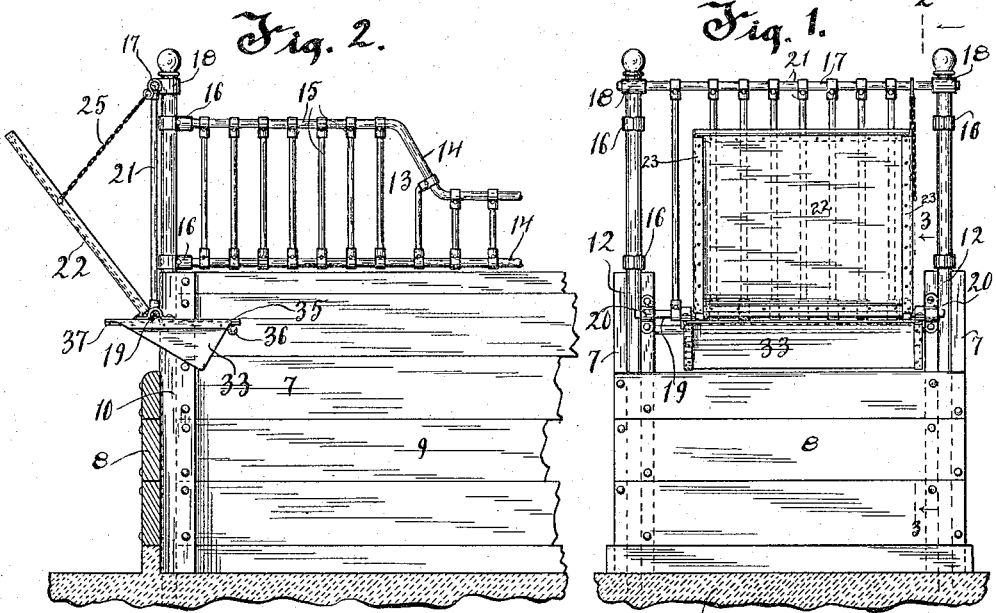
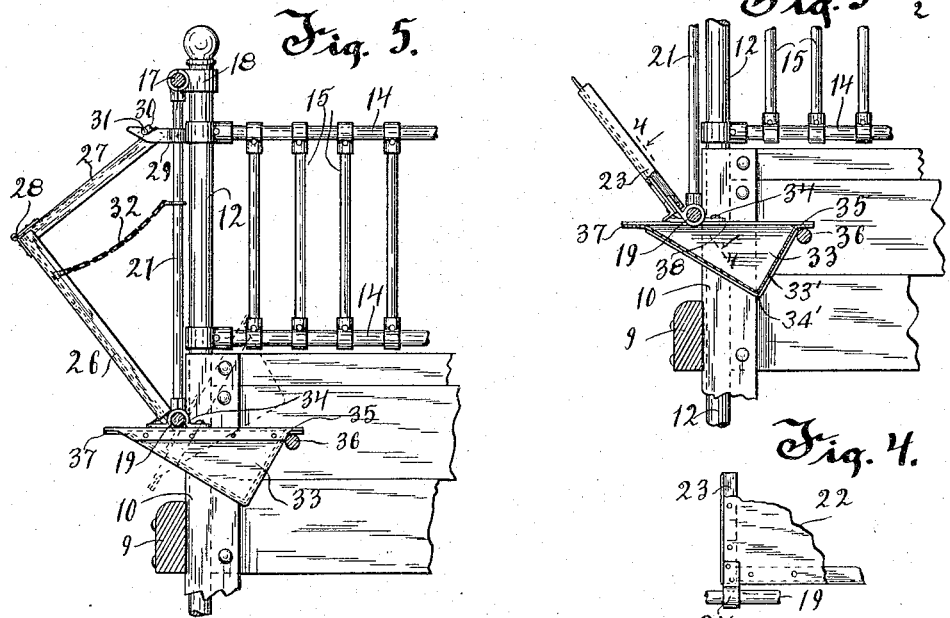
WITNESSES.
G. F. Miller.
E. Schowalter
INVENTOR
William Mitchell
Mursell, Keeney & French
ATTORNEYS.

UNITED STATES PATENT OFFICE.

WILLIAM MITCHELL, OF MILWAUKEE, WISCONSIN.

STABLE-FIXTURE.

1,201,068. Specification of Letters Patent. Patented Oct. 10, 1916.

Application filed April 15, 1915. Serial No. 21,506.

*To all whom it may concern:*

Be it known that I, WILLIAM MITCHELL, a citizen of the United States, and resident of Milwaukee, in the county of Milwaukee and State of Wisconsin, have invented new and useful Improvements in Stable-Fixtures, of which the following is a description, reference being had to the accompanying drawings, which are a part of this specification.

The invention relates to stable fixtures.

The invention designs more particularly to provide a fixture attached to the stall for horses or other animals for receiving the feed such as hay and grain.

It frequently happens where separate feeding devices are employed for hay and grain that the animal will eat the grain before the hay. This results in serious consequences if the animal, coming in hot, bolts the grain in this condition and produces many fatal cases of colic.

The present invention is designed to obviate this difficulty by providing a feeding device into which the hay is placed and grain thrown thereon whereby the animal in feeding will have to eat the hay with the grain which prevents bolting and permits feeding of grain without waiting for the animal to cool off without serious consequences.

The invention further designs to provide a feeding device in which both hay and grain may be placed and means for receiving and saving the grain for feed which filters down through the hay.

The invention further designs to produce a combined hay and grain rack and a manger for receiving any grain or hay leaves which may filter down through the rack.

The invention further designs to provide, in combination with a stall, a feed rack and manger which may be filled from the space in front of the stall.

The invention consists in the several features of construction hereinafter set forth and more particularly defined by claim at the conclusion hereof.

In the drawings Figure 1 is an end view of a stall showing the fixture embodying the invention attached thereto; Fig. 2 is a section taken on the line 2—2 of Fig. 1, parts being broken away; Fig. 3 is a section taken on line 3—3 of Fig. 1; Fig. 4 is a detail view of a part of the fixture; Fig. 5 is a view similar to Fig. 2 showing a modified form of the device.

The feeding device is shown as attached to a stall which consists of sides 7 and end 8 made of planking 9 which is bolted to corner pieces 10 said corner pieces being secured in upright position upon the stall floor 11 by means of supporting standards 12, the ends of the side planking and the sides of the end planking being recessed to receive said standards. Side guard frames 13 comprising side members 14 and cross bars 15 are disposed above the sides of the stall and are connected to the standards 12 by adjustable collars 16.

The feeding device comprises a rack disposed adjacent the front end of a stall and means adjacent said rack for receiving material from the same.

The rack comprises a fixed rack member and a movable rack member. The fixed rack member consists of a bar 17 secured to each of the standards 12 at the upper ends thereof by collars 18, a bar 19 removably secured in brackets 20 secured to the side planking and a plurality of bars 21 spaced apart and connected at their ends to the cross bars 17 and 19. The movable rack comprises a plate 22, preferably made of sheet metal, having angled edge members 23 secured thereto, the said plate being pivotally connected to the bar or rod 19 by any suitable connection, such as a clip 24. A chain 25 is secured to the bar 17 and to the plate 22 to limit the movement of the same.

In Fig. 5 a modified form of movable rack is shown which comprises plates 26 and 27 similar to the plate 22 and pivotally connected together by any suitable means such as a hinge 28. The plate 26 is pivotally connected to the rod 19 similar to the plate 22 and the upper end of the plate 27 is secured to the stall by a locking connection comprising brackets 29 having notches 30 in which pins 31 secured to the plate 27 engage. The plates 26 and 27, similar to the plate 22, have angled members 23 secured thereto and a chain 32 is connected to the plate 26 and one of the bars 21. In this construction the plate 27 forms a removable cover member for the rack.

The means adjacent the lower end of the rack for receiving material from the same comprises a manger 33 which is pivotally mounted on the rod 19 by bearing brackets 34 disposed to one side of the center of gravity of the manger and is sustained in its horizontal position by a cross rod 36 secured to the sides of the stall for receiving the front edge 35 of said manger. The rear edge 37 of the manger extends outwardly adjacent the alley in front of the stalls. The manger 33 comprises downwardly inclined sides 33' meeting to form a bottom edge 34' and form a manger of triangular cross section as shown in Fig. 3, the lowermost portion of said manger being disposed to one side of its center of gravity. The cross rod 38 is secured to the front and rear edges of the manger so that it may be readily tilted to the position shown in Fig. 5, to discharge material therefrom and the shape of the manger, as previously pointed out, is such that it may be readily cleaned and its contents discharged therefrom by swinging the manger on its bearings 34 and owing to the disposition of the manger it is readily accessible from the alley in front of the stall.

In the construction shown in Figs. 1 to 3 the hay may be placed in the rack from the alley in front of the stalls or from a hole in the loft above each stall and in the modification shown in Fig. 5 when the plate 27 is thrown out of locking engagement with the brackets 29 and in line with the plate 26, the rack may be loaded in the same way. After the hay has been put into the rack, grain may be placed upon it and as the horse feeds, the grain and fine hay which are not consumed by the animal while eating will filter down and be collected in the manger below the rack thus saving all the feed.

The invention thus exemplifies a feeding device comprising a rack made up of a fixed and a movable rack member and means below the rack for receiving material from the same.

The invention is not to be restricted to the details of construction herein set forth but the construction may be varied so long as it is within the scope of appended claims.

What I claim as my invention is:—

1. The combination, with a stall, of a rack comprising a fixed member and a movable member mounted at the front of the stall, said fixed member comprising a plurality of bars spaced apart and secured to the stall, said movable member comprising a plate pivotally secured to the stall in front of the fixed member and extending outwardly into the space in front of the stall, a plate pivotally secured to the free end of said first named plate, and means for detachably securing said last named plate to the stall, and a receptacle pivotally mounted upon the lower end of the rack and accessible from the space in front of the stall for receiving materials from the rack.

2. The combination, with a stall, of a rack, comprising a fixed member and a movable member mounted at the front of the stall, said fixed member comprising transverse bars secured to the sides of the stall and upright bars secured to said transverse bars, said movable member comprising a plate mounted at its lower edge to one of said transverse bars, and means for securing said plate at an angle with respect to said fixed member, a receptacle pivotally mounted adjacent its front end on said transverse bar, and a rod secured to the sides of the stall and upon which the rear edge of said receptacle rests, said receptacle extending beyond the rack and stall so as to be accessible from the space in front of the stall and resting by its own weight upon said rod and adapted to be tipped forwardly into the space in front of the stall.

3. In a stall, a feed rack comprising a fixed member and a movable member, said movable member comprising a plurality of plates pivotally secured together in front of the fixed member and extending into the space in front of the stall, one of said plates being pivotally secured to the stall, and means for detachably securing the other plate to the stall.

4. In a stall, a feed rack comprising a fixed member and a movable member, said movable member comprising a plurality of plates pivotally secured together and having angled edge members secured thereto, one of said plates being pivotally secured to the stall and means for detachably securing the other plate to the stall.

5. The combination with a stall provided with side walls and a front wall of less height than said side walls to form an open space therein, of an open sided and open top feed rack mounted adjacent the side walls at the front end of the stall and extending outwardly beyond the front wall thereof, and a tiltable manger pivotally disposed below said feed rack between said side walls and in the open space adjacent the front wall of the stall so as to be always accessible from the space in front of the stall.

6. In a stall having stall standards, a rack comprising a fixed member and a movable member, said fixed member comprising cross bars secured to the standard and a plurality of upright bars spaced apart and secured to said cross bars, said movable member comprising a plurality of plates pivotally connected together in front of the fixed member and extending into the space in front of the stall, means for connecting one of said plates to one of the cross bars, and means for detachably locking the other plate to the standards.

In testimony whereof I affix my signature.

WILLIAM MITCHELL.